(12) United States Patent
Jaramillo (10) Patent No.: US 6,301,632 B1
(45) Date of Patent: Oct. 9, 2001

(54) DIRECT MEMORY ACCESS SYSTEM AND METHOD TO BRIDGE PCI BUS PROTOCOLS AND HITACHI SH4 PROTOCOLS

(75) Inventor: Ken Jaramillo, Phoenix, AZ (US)

(73) Assignee: VLSI Technology, Inc., San Jose, CA (US)

( * ) Notice: Subject to any disclaimer, the term of this patent is extended or adjusted under 35 U.S.C. 154(b) by 0 days.

(21) Appl. No.: 09/277,860

(22) Filed: Mar. 26, 1999

(51) Int. Cl.[7] .............................. G06F 13/14; G06F 13/00; G06F 13/28
(52) U.S. Cl. .............................. 710/129; 710/22; 710/128
(58) Field of Search .................................... 710/126–132, 710/22–28

(56) References Cited

U.S. PATENT DOCUMENTS

| | | | |
|---|---|---|---|
| 5,619,728 | * 4/1997 | Jones et al. | 710/27 |
| 5,673,399 | * 9/1997 | Guthrie et al. | 710/128 |
| 5,850,571 | * 12/1998 | Odom et al. | 710/27 |
| 5,884,027 | * 3/1999 | Garbus et al. | 709/250 |
| 5,898,888 | * 4/1999 | Guthrie et al. | 710/128 |
| 5,953,538 | * 9/1999 | Duncan et al. | 710/22 |
| 6,081,851 | * 6/2000 | Futral et al. | 710/23 |
| 6,094,699 | * 7/2000 | Surugucchi et al. | 710/128 |
| 6,141,718 | * 10/2000 | Garnett et al. | 710/129 |

* cited by examiner

Primary Examiner—Sumati Lefkowitz
(74) Attorney, Agent, or Firm—Wagner Murabito & Hao LLP (57) ABSTRACT

The present invention is a direct access bridge for translating messages between a first protocol and a second protocol via a first component interface and a second component interface. The first and second component interfaces are adapted to respectively couple to a first and second protocol bus. The first component interface is also coupled to the second component interface. The first component interface is further adapted to transmit and receive data and fundamental message information to and from a first component via the first protocol bus using the first protocol. The second component interface transmits and receives the data and the fundamental message information to and from the second protocol bus in accordance with the second protocol. Similarly, the second component interface and the first component interface transform the data and fundamental message information from the first protocol to the second protocol and vice versa between the first and second bus. The fundamental message information from the second protocol bus to the first protocol bus; and the fundamental message information is provided to a memory coupled to the second protocol bus such that the first component has direct access to the memory. For example, in one embodiment of the present invention a direct access bridge system and method enables a PCI master component to perform a direct memory access read and write of information to a memory associated with an Hitachi SH4 microprocessor using the DDT protocol.

20 Claims, 6 Drawing Sheets

DIRECT MEMORY ACCESS SYSTEM AND METHOD TO BRIDGE PCI BUS PROTOCOLS AND HITACHI SH4 PROTOCOLS

FIELD OF THE INVENTION

The present invention relates to the field of electrical system bus protocol bridges. More particularly, the present invention relates to a bridge system and method to provide a PCI master direct access to memory associated with another component, such as memory associated with a Hitachi SH4 microprocessor.

BACKGROUND OF THE INVENTION

Electronic systems and circuits have made a significant contribution towards the advancement of modern society and are utilized in a number of applications to achieve advantageous results. Electronic technologies such as digital computers, calculators, audio devices, video equipment and telephone systems have facilitated increased productivity and reduced costs in analyzing and communicating data, ideas and trends in most areas of business, science, education and entertainment. Frequently, electronic systems designed to provide these results include a variety of components that need access to memory capable of storing information related to their functions.

Typically, the components of an electrical system require access to memory before information can be stored or retrieved. For example, microprocessors need access to a memory before they can retrieve program instructions and information related to an application from the memory. In addition to microprocessors, other components attached to or included in an application specific integrated circuit (ASIC) usually require access to memory. For example, audio devices need memory to store wavetable samples and modem devices require memory resources to hold communication data. Universal serial bus (USB) utilizes memory to retain link lists of functions it should perform and IEEE 1394 compliant systems (e.g., Firewire™) have registers that need to be maintained in a memory. This is just a partial list of the variety of electronic components that typically require memory capacity to perform a specific function.

Electronic systems typically rely on external memories to supply sufficient memory capacity for each component to perform their functions. External memories are usually either coupled directly to an electronic component (e.g., graphics memory is coupled directly to graphics chipset) or the memories are coupled to a system ASIC. Providing each component with its own external memory coupled directly to the component and/or coupling the memory to a system ASIC adds significant additional costs and inefficiencies to a system. Some components do not require large amounts of memory and significant resources are wasted on excess memory capacity if each component is provided with its own dedicated and directly coupled memory. In electronic systems with external memory coupled to a system ASIC, additional pins are required on the ASIC to handle the communications with the memory. The additional pins increase the cost of design and manufacture of the chip. Many of the additional costs and inefficiencies would be eliminated if one component could have direct access to another component's memory.

Differences in internal bus protocols of the components in an electrical system usually prevent a component from getting direct access to a memory coupled directly to another component. For example, virtually all electronic systems that include a microprocessor also include a main memory that has sufficient capacity to store information related to other components. However, the memory typically operates on the same protocol as its associated microprocessor and is usually different from the internal bus protocols of the other components. Thus, components other than the microprocessor of a microprocessor based application specific system, usually can not directly access a main memory.

The inability of one component to access a memory coupled directly to another component is even more pronounced in electronic systems in which one of the components utilizes new technology. In these situations, there usually are no component interfaces capable of connecting the internal buses of an ASIC and a new microprocessor. For example, in a situation where a microprocessor includes a memory controller that utilizes a new data transfer protocol and an internal ASIC bus is a PCI bus, the two components would typically not be able to communicate and the system ASIC would not have the ability to control direct memory accesses. The microprocessor operates on its own data transfer protocol which is different from PCI protocol. There would be no microprocessor interface to convert the data transfer protocol of the microprocessor to PCI protocol.

What is required is a bridge system and method that translates messages in one protocol into another protocol and permits one component to have direct access to another component's memory. The bridge system and method should not have to rely on each component having its own specific bridge interface with a memory component. It should permit a system to be built with fewer individual memory components than systems and methods with individual memory components for each device, smaller pin counts for system chips such as an ASIC, and designs that are more economical while still providing enough performance for most systems. For example, a system and method is needed that enables a master inside a system ASIC chip to have read and write access to a main memory associated with a microprocessor coupled to the system ASIC chip. In addition, the system and method should provide an interface capable of translating between an ASIC bus operating in a PCI protocol environment and a microprocessor with a different data transfer protocol.

SUMMARY OF THE INVENTION

The present invention is a method and system for a direct memory access bridge system and method that translates messages in one protocol into another protocol and permits one component to have direct access to another component's memory. The direct memory access bridge system and method does not have to rely on each component having its own specific interface to a memory component. It permits a system to be built with fewer individual memory components than prior art systems and methods, smaller pin counts for the system ASIC, and permits systems designs that are more economic in comparison to the prior art while still providing enough performance for most systems. For example, one embodiment of a direct memory access bridge system and method of the present invention permits a master inside a system ASIC chip to have read and write access to a main memory associated with a microprocessor coupled to the system ASIC chip. It also provides an interface capable of translating between a Hitachi SH4 microprocessor with a demand data transfer protocol and internal ASIC PCI bus.

In one embodiment, the present invention comprises a direct memory access bridge for translating messages between PCI protocols and SH4 protocols. The direct memory access bridge includes a PCI interface and an SH4 interface coupled to each other. The PCI interface is adapted to couple to a PCI bus and the SH4 interface is adapted to couple to an SH4 protocol bus. The PCI interface is adapted to transmit and receive data and fundamental message information to and from PCI devices coupled to the PCI bus (e.g., in accordance with PCI protocols). Fundamental message information includes information required to make conversions from one protocol to another, such as the address in the memory to which the data is bound and the amount of data that was received. The SH4 interface is adapted to transmit and receive the data and the fundamental message information to and from an SH4 microprocessor and memory coupled to the SH4 bus (e.g., in accordance with SH4 protocols). The SH4 interface and the PCI interface transform the data and fundamental message information from the PCI protocol to the SH4 protocol and transfer the data and the fundamental message information from the PCI bus to the SH4 protocol bus. Similarly, the SH4 interface and the PCI interface transform the data and fundamental message information from the SH4 protocol to the PCI protocol and transfer the data and the fundamental message information from the SH4 protocol bus to the PCI bus. In so doing, the interfaces cause the SH4 microprocessor to generate control signals that enable the PCI device to perform direct machine access reads and writes of information to the memory associated with the SH4 microprocessor. Thus, the PCI device can in effect directly access the memory and does not require its own specific interface to the memory component or its own dedicated memory.

DESCRIPTION OF THE DRAWINGS

The accompanying drawings which are incorporated in and form a part of this specification, illustrate embodiments of the invention and together with the description, serve to explain the principles of the invention.

BEST MODE FOR CARRYING OUT THE INVENTION

Reference will now be made in detail to the preferred embodiments of the invention, a method and system for a direct memory access bridge between two different protocols, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is a method and system for a direct memory access bridge system and method that translates messages in one protocol into another protocol and permits one component to have direct access to another component's memory. The direct memory access bridge system and method does not have to rely on each component having its own specific interface to a memory component. It permits a system to be built with fewer individual memory components than prior art systems and methods, smaller pin counts for the system ASIC, and permits system designs that are more economic in comparison to the prior art while still providing enough performance for most systems. For example, one embodiment of a direct memory access bridge system and method of the present invention permits a master inside a system ASIC chip to have read and write access to a main memory associated with a microprocessor coupled to the system ASIC chip. It also provides an interface capable of translating between a Hitachi SH4 microprocessor with a demand data transfer protocol and internal ASIC PCI bus.

Figure 1:
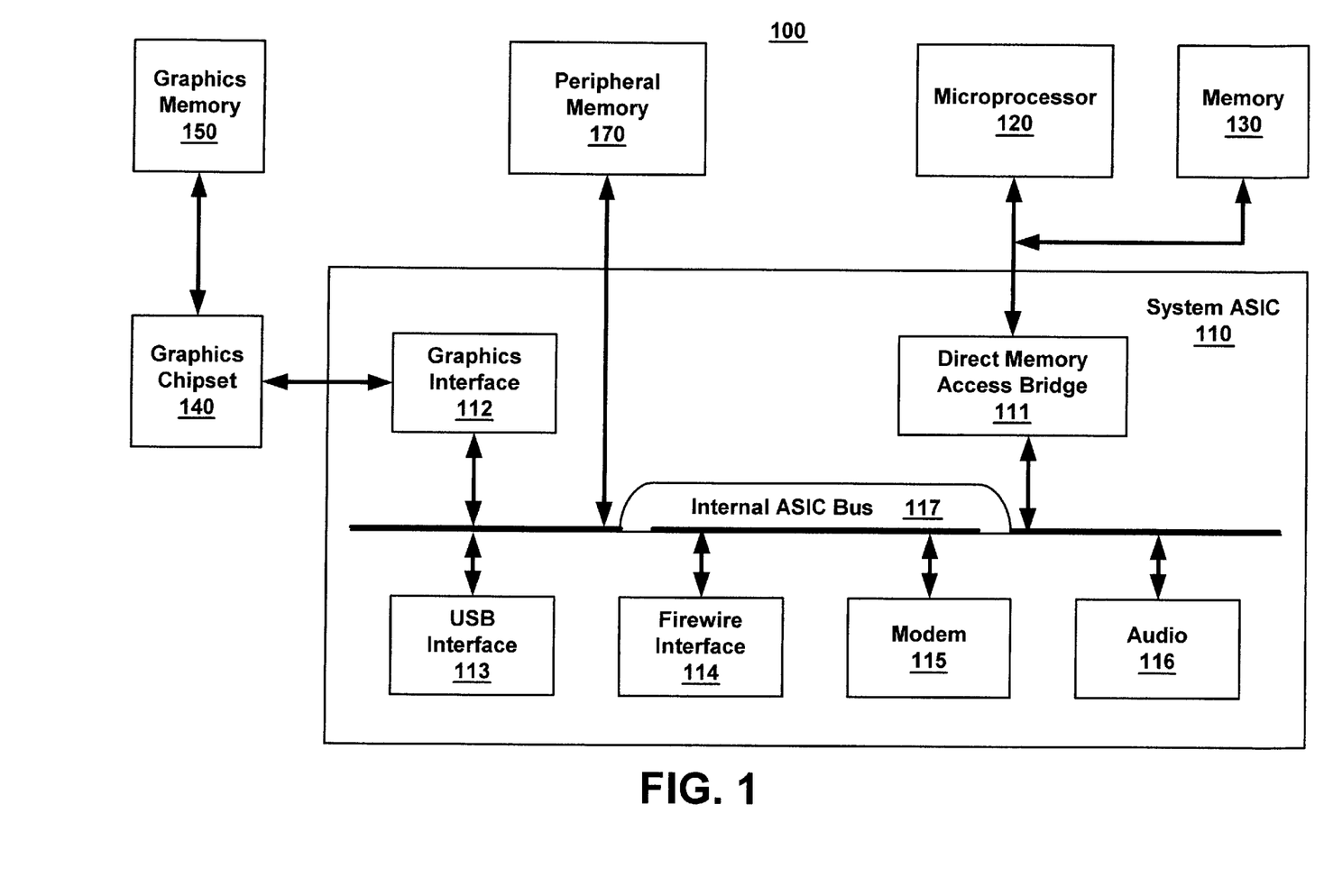
FIG. 1 shows a block diagram of a microprocessor based application specific system including one embodiment of a direct access bridge of the present invention.

FIG. 1 is a block diagram of a microprocessor based application specific system 100. Microprocessor based application specific system 100 includes a microprocessor 120, main synchronous dynamic random access memory (SDRAM) 130, a system ASIC 110, and a graphics chipset 140. The system ASIC 110 includes several components such as direct memory access bridge interface 111, graphics interface 112, USB interface 113, IEEE 1394 interface 114, a modem 115, an audio component 116, and internal ASIC bus 117. System ASIC 110 is coupled to microprocessor 120, main SDRAM 130 and graphics chipset 140. Microprocessor 120 is also coupled to main SDRAM 130. System ASIC 110 permits components or devices coupled to direct memory access bridge interface 111 (e.g., Microprocessor 120 or SDRAM 130), graphics interface 112, USB interface 113, IEEE 1394 interface 114, modem 115, and audio component 116 to communicate with each other, via internal ASIC bus 117.

In one embodiment of the present invention, a direct memory access bridge is utilized for translating messages between a first protocol and a second protocol via a first component interface and a second component interface. The first component interface is adapted to couple to a first protocol bus and the second component interface is adapted to couple to a second protocol bus. The first component interface is also coupled to the second component interface. The first component interface is further adapted to transmit and receive data and fundamental message information to and from a first component via the first protocol bus using the first protocol. The second component interface is further adapted to transmit and receive the data and the fundamental message information to and from the second protocol bus in accordance with the second protocol. The second component interface and the first component interface are adapted to transform the data and fundamental message information from the first protocol to the second protocol and transfer the data and the fundamental message information from the first protocol bus to the second protocol bus. The second component interface and the first component interface are adapted to transform the data and fundamental message information from the second protocol to the first protocol and transfer the data and the fundamental message information from the second protocol bus to the first protocol bus; and the fundamental message information is provided to a memory coupled to the second protocol bus such that the first component has direct access to the memory. For example, in one embodiment of the present invention a direct memory access bridge system and method enables a PCI master component to perform a direct machine access read and write of information to a memory associated with an Hitachi SH4 microprocessor.

Figure 2:
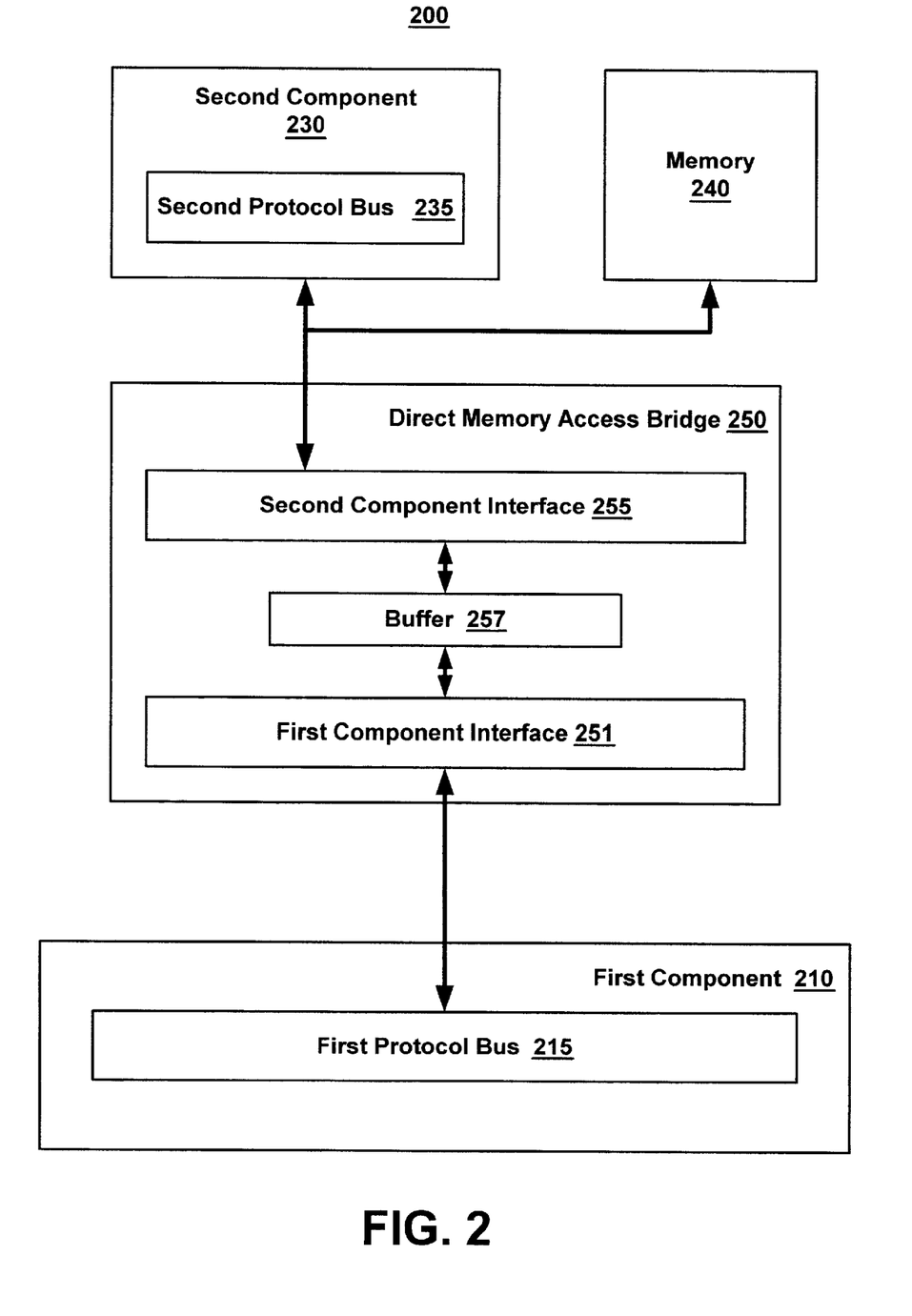
FIG. 2 is a block diagram of a direct memory access bridge system for translating between a first protocol and a second protocol while providing direct access from one component to memory associated with another component.

FIG. 2 is a block diagram of a direct memory access bridge system 200 for converting a message from a first protocol to a second protocol and providing direct access from one component to memory associated with another component. Direct memory access bridge system 200 comprises a direct access bridge 250, first component 210, second component 230, and memory component 240. First component 210 includes first protocol bus 215 and second component 230 includes second protocol bus 235. Direct access bridge 250 includes a first component interface 251, a second component interface 255 and a staging buffer 257. First protocol bus 215 is coupled to first component interface 251 which is coupled to staging buffer 257. Second protocol bus 235 is coupled to memory component 240 and second component interface 255, which is coupled to staging buffer 257.

Direct access bridge 250 permits first component 210 to communicate with second component 230 and have direct access to memory component 240. First component interface 251 is compliant with the first protocol and is adapted to recognize and directly transmit messages between first component 210 and staging buffer 257. Second component interface 255 is compliant with the second protocol and is adapted to recognize and directly transmit messages between staging buffer 257, second component 230, and memory 240.

In one embodiment of the present invention shown in FIG. 2, second component 230 facilitates the transfer of direct memory access (DMA) messages from second component interface 255 to memory 240. In this embodiment, second protocol bus 235 operates in a second protocol that supports direct access to an input/output DMA controller (not shown) included in second component 230. The input/output DMA controller (not shown) included in second component 230 issues control signals (e.g., read and write commands) to memory 240 in response to requests forwarded from second component interface 255. In instances where second component interface 255 utilizes the input/output DMA controller in second component 230 to transfer messages to memory 240, the other portions of second component 230 are not interrupted and are allowed to continue with their operations. Messages directed to the input/output DMA controller in second component 230 do not interrupt the other portions of second component 230 and are considered DMA messages.

Two frequently transferred messages between first component 210 and memory component 240 are associated with read and write commands. Direct access bridge 250 transforms a first protocol write command addressed to memory 240 into a request to transfer data from first protocol bus 215 to memory component 240. Direct access bridge 250 also transforms a first protocol read command addressed to memory 240 into a request to transfer data from memory component 240 to first protocol bus 215. Direct access bridge 250 utilizes first component interface 251, second component interface 255 and staging buffer 257 to transform commands into requests.

First component interface 251 directs communications between direct access bridge 250 and first component 210 and performs an analysis of first component internal bus protocol messages. Fundamental message information required to make conversions from one protocol to another, such as the address in the memory 240 to which the data is bound and the amount of data that was received, is extracted and calculated by first component interface 251. First component interface 251 ensures that certain problems are avoided and data ordering is preserved, including the restriction of data communications traffic through first component interface 251 so that a read transfer does not pass by a write transfer and vice versa. First component interface 251 also prepares data for storage. Data and fundamental message information is sent to and from staging buffer 257.

Staging buffer 257 (shown in FIG. 2) provides a storage capacity that permits data and fundamental message information to be collected, collated and transmitted at an appropriate time. Data from memory 240 that is prefetched in response to read command from first component 210 is temporarily stored in staging buffer 257. Staging buffer 257 stores data between first component 210 and memory 240 until all the data associated with a write command from first component 210 has been gathered. When the data has been gathered and stored for an appropriate period, it is forwarded to the first component interface 251 or second component interface 255, depending on the prescribed direction of the data traffic.

Second component interface 255 facilitates message transfers to and from second protocol bus 235. The fundamental message information stored in staging buffer 257 is transformed by second component interface 255 into fundamental transfer request information that satisfies the requirements of the second protocol. Second component interface 255 also assists in determining various fundamental transfer request information counts needed to perform the transfers, for example the number of data words transferred in response to a read command addressed to memory 240 and issued by first component 210. The control functions provided by second component interface 255 include selecting whether read data or write data is driven to or from second protocol bus 235.

There are a number of different embodiments of bridge system 200. For example, in one embodiment there is no buffer and the translations are routed directly between first component interface 251 and second component interface 255. In another embodiment of bridge system 200, first component 210 and direct access bridge 250 are incorporated on an ASIC, where the first protocol bus 215 is the ASIC's internal bus. There are a variety of additional components incorporated on the ASIC, for example a graphics interface, a USB interface, a IEEE 1394 interface, a modem and an audio component, which are all coupled to the ASIC's internal bus.

Figure 3:
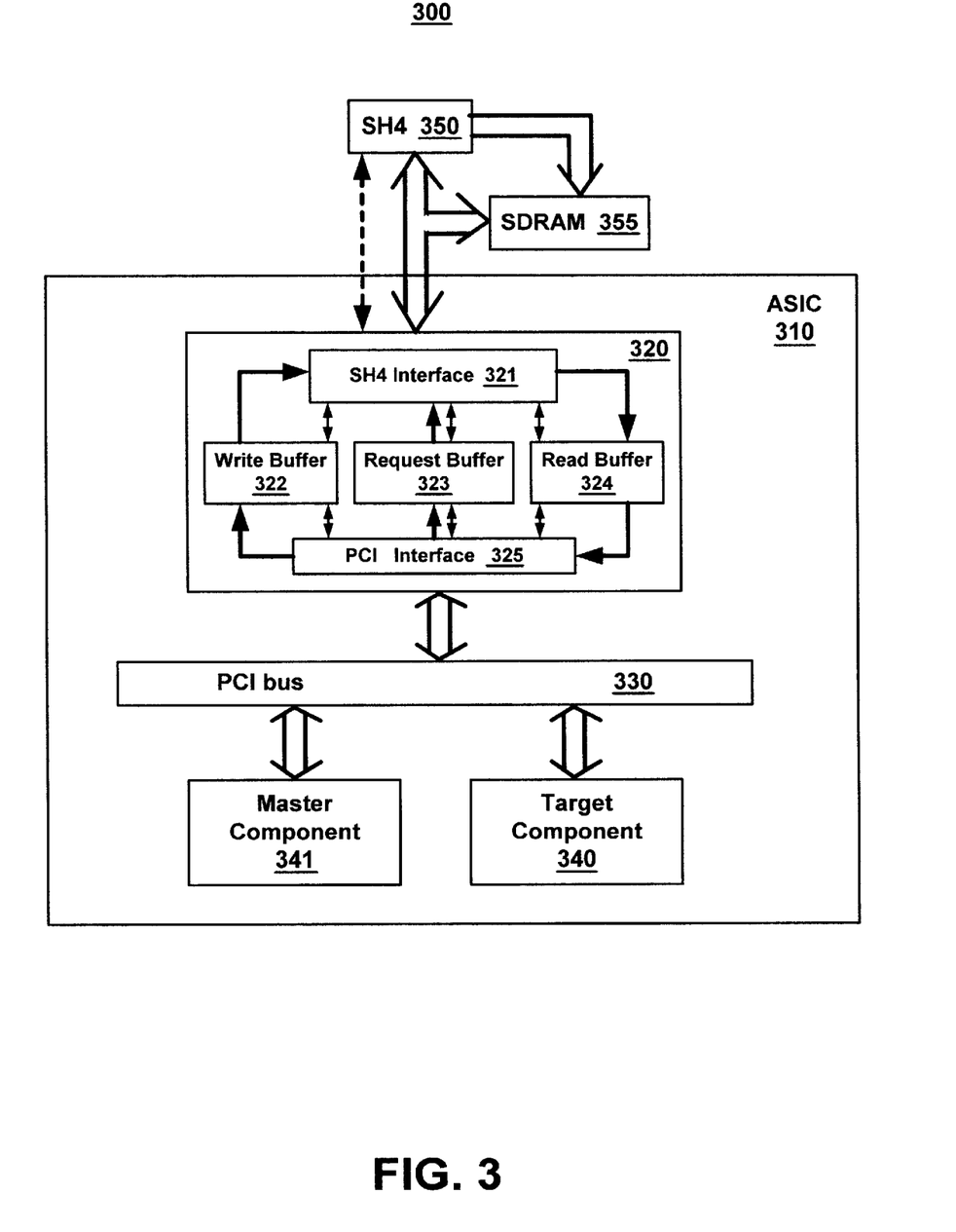
FIG. 3 shows a block diagram of one embodiment of the present invention, a PCI to SH4 direct memory access bridge system for translating between a PCI protocol and an SH4 microprocessor DDT protocol and providing PCI master component with direct access to a SDRAM memory associated with a SH4 microprocessor.

FIG. 3 shows a block diagram of one embodiment of the present invention, PCI to SH4 direct memory access bridge system 300. PCI to SH4 direct memory access bridge system 300 comprises an ASIC 310, an SH4 microprocessor 350 and SDRAM 355. ASIC 310 comprises a PCI to SH4 direct access bridge 320, PCI bus 330, target component 340 and master component 341. Target component 340 and master component 341 are peripheral components. In another embodiment, the peripheral components act as both a master and target; for example, a graphics interface, a USB interface, a IEEE 1394 interface, a modem, or an audio device. PCI to SH4 direct access bridge 320 is coupled to SH4 microprocessor 350, SDRAM 335 and PCI bus 330 which is coupled to target component 340 and master component 341. PCI to SH4 direct access bridge system 300 allows PCI components such as target component 340 and master component 341 to have read and write access to SDRAM 335, the main memory for SH4 microprocessor 350.

SH4 microprocessor 350 performs arithmetic operations, manipulates data, makes decisions, and issues commands related to the operations of PCI to SH4 direct access bridge system 300. Hitachi's SH4 microprocessor 350 includes an internal 4 channel direct memory access (DMA) controller. While only two of the channels are pinned out for external devices (e.g., ASIC 310) to use, SH4 microprocessor 350 has a protocol called demand data transfer (DDT) that permits an external device to access all 4 DMA channels when requesting a DMA transaction. DDT protocol requires an external device attempting to issue a DDT request to provide fundamental DDT request information including the DMA channel that it wishes to use, the SDRAM 335 address related to the transfer, the amount of data to be transferred, and the direction of data transfer. The DMA controller in SH4 microprocessor 350 is capable of responding to a DDT request by performing a transfer to or from the main memory SDRAM 335 and handling memory specific control signals without interrupting other processes in SH4 microprocessor 350.

PCI to SH4 direct access bridge 320 translates PCI cycles from the PCI protocol of PCI bus 330 into requests in SH4 protocol and vice versa. The ability to transform PCI commands into DDT requests permits PCI master 341 to have direct access to SDRAM 335. PCI write cycles are translated by PCI to SH4 direct access bridge 320 into DDT requests for the DMA controller in SH4 microprocessor 350 to transfer data from master component 341 to SDRAM 355. PCI to SH4 direct access bridge 320 also transforms PCI read cycles into DDT requests for the DMA controller in SH4 microprocessor 350 to transfer data from SDRAM 335 to master component 341.

PCI to SH4 direct access bridge 320 (see FIG. 3) utilizes a first bus interface, a second bus interface and a buffer system to transform PCI cycles into DDT requests and provide master component 341 with the ability to directly access memory in SDRAM 335 . PCI to SH4 direct access bridge 320 comprises SH4 interface 321, write buffer 322, request buffer 323, read buffer 324 and. PCI interface 325. SH4 interface 321 is coupled to write buffer 322, request buffer 323 read buffer 324, SH4 microprocessor 350 and SDRAM 335. PCI interface 325 is also coupled to write buffer 322, request buffer 323 and read buffer 324 and PCI bus 330.

PCI interface 325 is compliant with standard PCI protocol specification guidelines and ensures PCI to SH4 direct access bridge 320 adheres to PCI bus protocol. In adhering to PCI protocol, PCI interface 325 acts as a PCI target sometimes and acts as a PCI master at other times. For example, when master component 341 wants to directly access SDRAM 335, PCI interface 325 functions as a PCI target. When SH4 microprocessor 350 issues a command to target component 340, PCI interface 325 behaves as a PCI master. PCI interface 325 facilitates the participation of SH4 microprocessor 350 and SDRAM 335 in PCI cycles while providing a system and method for master component 341 to have direct access to SDRAM 335. Some embodiments of PCI to SH4 direct access bridge system 300 have internal PCI busses that do not support every attribute of a standard PCI protocol specification. In another embodiment PCI to SH4 direct access bridge 320 has the ability to perform DMA operations itself and moves data from SDRAM 335 to the PCI target component 340. For example, PCI to SH4 direct access bridge 320 forwards a DDT request to SH4 microprocessor 350 for data to be transferred from SDRAM and behave as a master moving the data to PCI target component 340.

PCI interface 325 selects one of the four DDT channels of the input/output DMA controller in SH4 microprocessor 350 to utilize during a direct access of SDRAM 335 by master component 341. Channel 0 is usually selected and supports the specification of fundamental DDT request information such as address, direction, and amount of data to be transferred. In the present embodiment, channels 1–3 allow a transfer request to be made but do not support the specification of fundamental DDT request information. If channels 1–3 are chosen, the actual fundamental DDT request information must be preprogrammed into DMA controller registers associated with SH4 microprocessor 350.

In instances when master component 341 initiates a PCI write cycle seeking direct access to SDRAM 335, PCI interface 325 prepares the associated PCI master data for transfer to staging buffers (write buffer 322, request buffer 323 and read buffer 324). PCI interface 325 begins the preparation of PCI master data in response to a variety of PCI write commands (e.g., "Write" and "Write and Invalidate"), all of which are transformed by PCI to SH4 direct access bridge 320 into a basic DDT "write" request. When a write command is directed to SDRAM 335, PCI interface 325 analyzes the PCI write cycle and extracts fundamental message information about the data and commands in the PCI cycle comparable to requisite fundamental DDT request information. For example, PCI interface 325 determines fundamental message information such as the amount of data that was received and is being associated with a DDT request and the address in SDRAM 335 to which the data is bound.

Referring again to FIG. 3, there are a variety of factors that PCI to SH4 direct access bridge 320 considers in calculating fundamental message information included in a basic write command. For example, PCI to SH4 direct access bridge 320 combines incoming PCI master data allowing a single DDT request associated with a single block of data to be transmitted to SH4 microprocessor and SDRAM 335, rather than relying on several DDT requests associated with smaller blocks of data. Data from one PCI burst or data from several PCI cycles can be combined into a single block. Grouping PCI master data in this manner is factored into calculations by PCI interface 325 of the amount of data to be incorporated in a DDT request and the address in SDRAM 355 to which the data is bound. In addition, PCI interface 325 also makes adjustments in calculating the data address in SDRAM 335 to compensate for the fact that the PCI bus protocol uses byte enables whereas the DDT SH4 bus protocol does not. SH4 microprocessor 350 requires data to be properly aligned. For example, if the size specified for transfer is several 32 byte blocks, then the address specified must be 32 byte aligned. The present embodiment of PCI to SH4 direct access bridge 320 makes sure transfers of data are the appropriate size (e.g., byte, word, longword, quadword, or 32 byte) and are contiguous.

In instances when master component 341 initiates a PCI read cycle seeking direct access to information in SDRAM 335, PCI interface 325 extracts the fundamental message information required to initiate an appropriate DDT request. PCI interface 325 extracts the fundamental message information from the PCI master command message in response to a variety of PCI read commands (e.g., "Read", "Read Cacheline", and "Read multiple"), all of which are translated by PCI to SH4 direct access bridge 320 into a basic DDT "read" request. PCI interface 325 does not assert a PCI target ready (TRDY) signal as soon as PCI interface 325 has decoded a PCI read command, it waits until the DDT has occurred and read data is available. The PCI master specified address is stored until the DDT request is prepared. Included in the DDT request is a block of data specified by PCI interface 325 to be prefetched, for example 32 bytes or larger since the DMA controller in SH4 microprocessor 350 fetches at least 32 bytes at a time during memory reads.

As part of handling reads and writes from master component 341, PCI interface 325 ensures that certain problems are avoided. By ensuring problems are avoided PCI interface 325 increases the overall efficiency of PCI to SH4 direct access bridge system 300. For example PCI interface 325 ensures that data ordering is preserved (e.g., read transfers cannot pass write transfers and vice versa), that standard PCI retry requirements are satisfied, that sufficient support for delayed transactions is provided, that potential deadlock situations are handled and that potential PCI master starvation is minimized.

PCI interface 325 satisfies PCI retry requirements by adhering to PCI specification "16 tick" or "8 tick" rules regarding retries. If PCI interface 325 knows that the transaction cannot be complete within a maximum time (e.g., 16 or 8 ticks), it issues a retry to the PCI master. In the case of writes, this is likely to occur if the staging buffers are full. In the case of reads, this is likely to occur if the PCI interface 325 receives an indication that SH4 microprocessor 350 will not respond to (or even allow) any DDT requests within the maximum time.

PCI interface 325 contributes support for delayed transactions by providing appropriate storage capacity. In the case of a write command PCI interface 325 supports "write posting". In the case of reads, PCI interface 325 is able to accept a read command and store the appropriate information (e.g., address, bus grants, byte enables, etc.) while it prefetches the read data after issuing a retry. When master component 341 retries the read command, PCI interface 325 is usually prepared to respond.

PCI interface 325 (shown in FIG. 3) is capable of handling a variety of potential deadlock/livelock situations. By preventing the deadlock/livelock situations from occurring, PCI interface 325 is able to provide smoother communication of data through PCI to SH4 direct access bridge 320. Deadlock/livelock situations usually arise because SH4 microprocessor 350 (unlike a PCI master) has no way of being backed off during a memory read or write. A typical example of a deadlock/livelock situation occurs when SH4 microprocessor 350 attempts to access master component 341 while master component 341 is in the process of writing or reading data to or from SDRAM 355. Another example of a deadlock/livelock situation occurs when PCI to SH4 direct access bridge 320 prefetches a block of data for a previously received PCI read command and master component 341 only requests a portion of the prefetched data.

In deadlock situations when SH4 microprocessor 350 attempts to access master component 341 while master component 341 is in the process of writing or reading data to or from SDRAM 335, PCI interface 325 will temporarily stop master component 341 from continuing to write or read to or from SDRAM 335. PCI interface 325 will stop master component 341 by issuing retries to the PCI master until SH4 microprocessor 350 completes its transaction with master component 341. If PCI interface 325 did not issue a retry, a deadlock is likely to occur because SH4 microprocessor 350 cannot complete its transfer until PCI bus 330 is free. However, PCI bus 330 cannot become free until the PCI master can complete its transfer to SDRAM 335, which can not happen until SH4 microprocessor 350 completes its transfer. For writes a PCI master is retried as soon as the bridge's staging buffers are full. For reads a PCI master is retried if the bridge determines that it cannot make the DDT request or that the DDT cannot take place within a reasonable period of time. In some other embodiments the PCI target interface retries a PCI master immediately after a read command is received.

A deadlock results when PCI target interface 325 does not send enough flush signals to the staging buffers. If PCI to SH4 direct access bridge 320 prefetches a block of data for a previously received PCI read command and a PCI master only requests a portion of this data the remainder of the data is left in the buffer (e.g., read buffer 324). Without interaction by PCI target interface 325, eventually the buffers becomes clogged with this "leftover" data and do not permit any data to flow through. PCI target interface 325 regularly signals the PCI to SH4 direct access bridge 320 staging buffers (324) to flush an appropriate amount of data and purge extra read data. By indicating buffers should be flushed, PCI interface 325 prevents the buffers from becoming clogged and peripheral devices (e.g., master component 341 or target component 341) from being starved of access to SDRAM 335.

Referring again to FIG. 3, direct access bridge's 320 staging buffers temporarily store data and fundamental message information. In the present embodiment master component 341 and SH4 microprocessor 350 lie in different clock domains and the staging buffers store the information long enough to compensate for the differences in clock domains. Direct access bridge's 320 staging buffers include write buffer 322, request buffer 323 and read buffer 324. Write buffer 322 stores master component 341 write data that is bound for SDRAM 335 and improves the performance of write transfers. Read buffer 324 stores SDRAM 335 data which was prefetched in response to a read command from master component 341 and improves the performance of read transfers. Request buffer 323 temporarily stores fundamental message information comparable to fundamental DDT request information as it passes from PCI interface 325 to SH4 interface 321 and vice versa.

The staging buffers comprise numerous configurations in a variety of embodiments. In some embodiments, the write buffer and read buffer are one bidirectional buffer. In other embodiments the staging buffer sizes may be larger or smaller than the present embodiment staging buffer sizes (a multiple of 32 bytes), depending on what the specific application requires. Request buffer 323 allows several PCI cycles to be handled "simultaneously". In some other embodiments of the present invention the PCI interface holds the transfer request information for the current PCI read or write command until a DDT transaction is complete. Some other embodiments of the present invention do not include staging buffers, information is transferred directly between PCI interface 325 and SH4 interface 321.

SH4 interface 321 issues DDT requests and transfers data during an actual DDT transaction. Therefore, it supports the DDT protocol as defined by the specifications for SH4 microprocessor 350. For write commands from master component 341 to SDRAM 335, SH4 interface 321 retrieves fundamental message information from request buffer 323, rearranges it to resemble fundamental DDT request information, issues a DDT request, and transfers data from the write buffer 322 to SDRAM 335 in accordance with DDT protocol. For read commands issued by master component 342 and directed to SDRAM 335, SH4 interface 321 retrieves fundamental message information from request buffer 323, rearranges it to resemble fundamental DDT request information, issues a DDT request, and transfers the corresponding data from memory 355 to read buffer 324.

Figure 4:
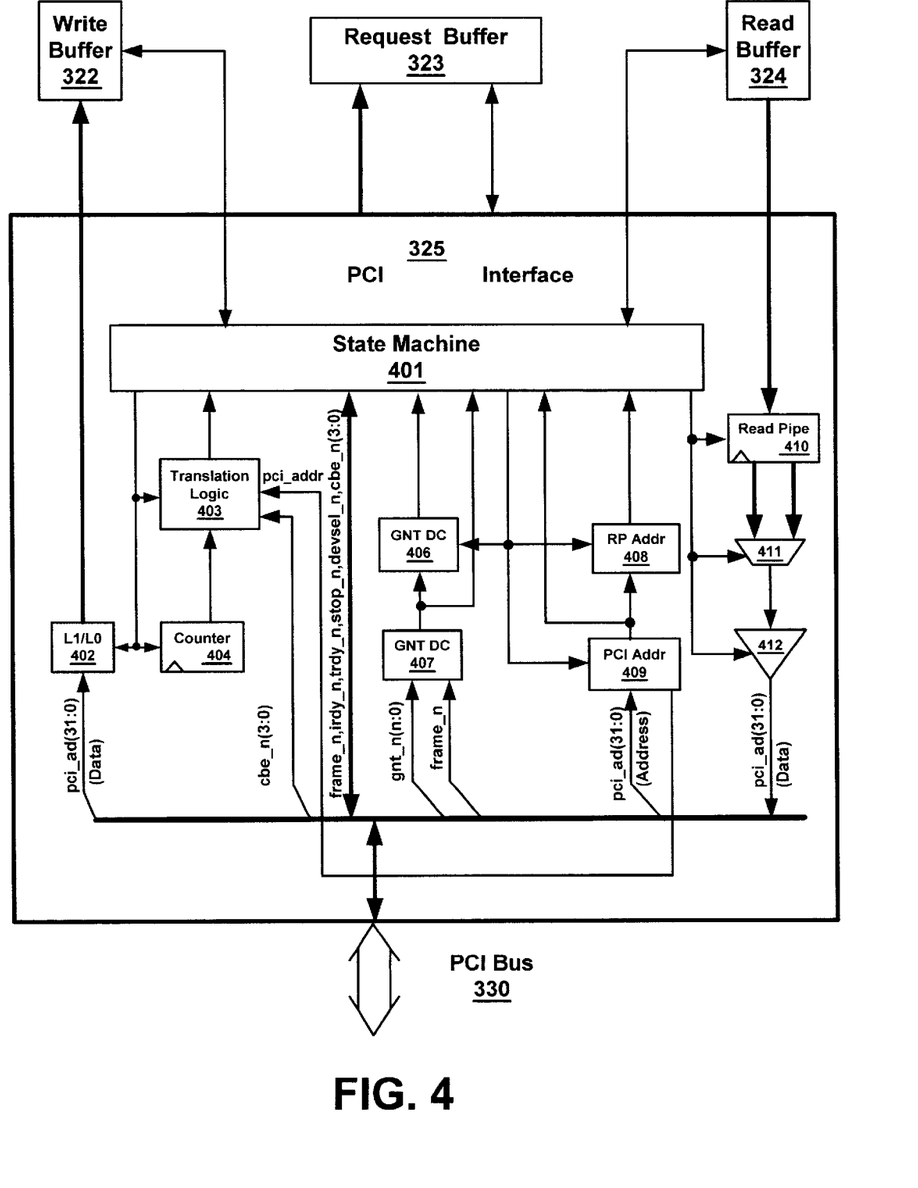
FIG. 4 is a schematic block diagram of PCI interface included in PCI to SH4 direct memory access bridge system.

FIG. 4 is a schematic block diagram of PCI interface 325. PCI interface 325 comprises PCI state machine 401, L1/L0 register 402, translation logic 403, PCI data counter 404, GNT_DC register 406, GNT register 407, RP Addr register 408, PCI Addr 409, Read_Pipe 410, multiplexer (MUX) 411 and output driver 412. PCI bus 330 is coupled to PCI state machine 401, L1/L0 register 402, translation logic 403, GNT register 407, PCI Addr 409, and output driver 412. PCI state machine 401 is coupled to L1/L0 register 402, translation logic 403, GNT_DC register 406, GNT register 407, RP Addr register 408, PCI Addr 409, Read_Pipe 410, MUX 411 and output driver 412. Translation logic 403 is coupled to PCI data counter 404, GNT_DC 406 is also coupled to GNT 407, and RP Addr 408 is coupled to PCI Addr 409 which is coupled to translation logic 403. Read_Pipe 410 is coupled to MUX 411 which is coupled to output driver 412. PCI interface 325 acts as a PCI target to capture PCI cycles addressed to SDRAM 33.

A first state machine, PCI state machine 401 is the "brain" of PCI interface 325 and is responsible for initiating most of the control commands. It is responsible for interfacing with PCI bus 330, decoding PCI write and read cycles targeted at SDRAM 335, generating various PCI signal outputs (trdy_n, stop_n, devsel_n), resolving deadlock conditions which involve direct memory access bridge 320, latching data from PCI bus 330 during write cycles and presenting it to write buffer 322, assembling information required to make a DDT request (transfer size, direction, transfer count, address, channel ID, etc.), placing fundamental DDT request information in request buffer 323, and writing and reading data to and from the write and read buffers. PCI state machine 401 also determines how the PCI data should be split up into DDT requests (data combining and byte merging) and controls the registers included in PCI interface 325.

The six registers shown in FIG. 4 associated with PCI interface 325 provide a variety of latching functions. First register (L1/L0 Register 402) includes two 32 bit registers that are used to latch PCI master data associated with a write command and converts 32 bit PCI data into 64 bit SDRAM data. Second register (Read_Pipe register 410) is a 64 bit register to latch data output from read buffer 324 to help pipeline data during PCI bus read cycles to provide zero wait state read accesses. Third register (PCI Addr register 409) is a 32 bit register to latch the PCI master's address so that the State Machine can determine if the cycle is meant for SDRAM 355. Fourth register (RP Addr register 408) is a 32 bit register that stores the PCI Master's address during read cycles for pending read operations (e.g., delayed completion cycles). Fifth register (GNT register 407) and sixth register (GNT_DC register 406) latch the state of the PCI bus arbiter's bus grants.

GNT register 407 and GNT_DC register 406 are also utilized if "pseudo delayed completions" are supported (see U.S. patent application Ser. No. 08/947,650 "A Method and System for Pseudo Delayed Transactions Through a Bridge to Guarantee Access to a Shared Resource", incorporated herein by this reference). GNT register 407 latches the bus grant signals until frame_n is asserted, and this information is used by PCI state machine 401 to determine who is the current PCI master, to ascertain how large of a read prefetch is necessary during reads of SDRAM 355 and to decide which DMA channel to use. The information in GNT register 407 is then latched in GNT_DC register 406. If other PCI masters attempt to access the memory their grants are latched in GNT_DC register 406 in a manner that queues them up in a first come basis until the associated transaction is complete. A retry is issued by state machine 401 if it is busy with the previous transaction, for example write buffer 322, request buffer 323 or read buffer 324 are occupied. State machine 401 will continue to issue retry signals to any PCI master that attempts to access memory SDRAM 355 until it is finished processing the first transaction. When the first access is complete it will continue to issue retries to any PCI master that does not match the grant that is next in the queue. GNT_DC register 406 permits state machine 401 to work its way through the queued up "pseudo delayed completion" of access attempts ensuring devices get an opportunity to access memory SDRAM 355.

PCI interface 325 also utilizes miscellaneous circuitry to assist in performing its functions. Translation logic 403 helps PCI state machine 401 form the transfer count, address, and data size fields for the DDT request. PCI data counter 404 is used to count data as it is received during write cycles. The count is utilized to form the transfer count field of the DDT request. MUX 411 is a 2×1 multiplexer that is used to multiplex read data from read buffer 324 during PCI master reads and converts 64 bit SDRAM 355 data in read buffer 324 into 32 bit data in accordance with PCI bus protocol.

There are other embodiments of PCI interface 325 that have alternative components perform some of the requisite functions. For example, in some embodiments translation logic 403 circuitry is not required because the state machine has the intelligence to watch the data as it comes in, figure out its alignment, calculate how much data has been received, etc. From this information the alternate embodiment is able to form the fields in the DDT. In another embodiment the pending read address is stored by a read counter capable of supporting large read buffers. The read counter is loaded with a current PCI master's address for later comparison that establishes the current master is the one the delayed transaction was started for. In a different embodiment, the read counter is incremented in case the prefetch size is large and a PCI Master has to read the data in several PCI burst cycles.

Referring again to FIGS. 3 and 4, PCI to SH4 direct memory access bridge 320 processes write and read transfers under appropriate conditions. For example, PCI to SH4 direct memory access bridge facilitates a DMA read or write from master component 341 to SDRAM 355. PCI state machine 401 examines a PCI cycle and determines if the target of the cycle is SDRAM 355. To make this determination, PCI state machine 401 compares the address that it latched in PCI Addr register 409 to addresses in SDRAM 355. If the target is SDRAM 355 and there is enough room in the staging buffers (write buffer 322, request buffer 323 and read buffer 324), PCI state machine 401 facilitates the read or write transfer.

PCI state machine 401 facilitates the read or write transfer by extracting and calculating the fundamental message information to be included with the DDT request. The initial address in SDRAM 355 is retrieved from PCI Addr register 409 and PCI state machine 401 generates requisite lower address bits for non 32 byte or non 64 bit DDT transfers. In a write command the transfer data count is retrieved from PCI data counter 404 and translation logic 403. In a read command the transfer data count is generated by state machine 401 with the assistance of translation logic 403. The data size associated with a write or read command is determined by state machine 401 with input from translation logic 403. The direction and DMA channel information is selected by PCI state machine 401. PCI state machine 401 writes the fundamental message information into request buffer 323

In the case of a write command addressed to SDRAM 355 by a PCI master, PCI state machine 401 directs the transfer of a PCI master's data into write buffer 322. PCI state machine 401 signals L1/L0 register 402 to store the PCI master's 32 bit data (the PCI bus in this embodiment is a 32 bit bus) until enough data is gathered to write 64 bits at a time to write buffer 322. If data combining or byte merging is performed, it is facilitated by PCI state machine 401 with the help of PCI data counter 404 and translation logic 403. PCI state machine 401 uses PCI data counter 404 to count the total number of PCI data words received. As soon as the PCI master has completed its PCI cycle or write buffer 322 has been filled (whichever comes first), PCI state machine 401 calculates the amount of information to be included with a DDT request and writes this amount into the request buffer.

In a read command situation, PCI state machine 401 latches the target address into the RP Addr register 408, issues a retry to a PCI master, and then begins a delayed transaction for the PCI master. Until SH4 interface 321 has transferred a predefined minimum amount of data into the read buffer (e.g., two 64 bit words) the PCI state machine 401 will issue retry signals to the PCI master this delayed transaction was started for. After the DDT request information is written into request buffer 323, SH4 interface 321 will facilitate the transfer of data from SDRAM 355 into read buffer 324. As soon as SH4 interface 321 has transferred enough data into read buffer 324 to enable an efficient transfer to the data to the PCI master, first PCI state machine 401 will then accept read cycles from the original PCI master.

PCI state machine 401 controls the transfer of data from read buffer 324 to a PCI master. PCI state machine 401 uses the Rd_Pipe register 410 to pipeline data from read buffer 324. This helps make the read transfer very efficient (zero wait states). PCI state machine 401 controls MUX 411 in a manner that causes it to translate the 64 bit data output of read buffer 324 into 32 bit data that the PCI master requires. If the PCI master completes its burst and does not read all of the data that was prefetched for it by PCI state machine 401, then read buffer 324 will be flushed to clear unread data. In another embodiment, the flushing of read buffer 324 is held off until a predetermined amount of time has expired or if the original PCI master does not return in the next PCI cycle for the rest of the data.

PCI state machine 401 also participates in the prevention of potential operational problems. For example, PCI state machine 401 guarantees data ordering by controlling how request buffer 323 passes fundamental message information from PCI interface 325 to SH4 interface 321. SH4 interface 321 processes these requests in the order they are written into request buffer 323. Processing the requests in the order they are written ensures that PCI read transfer requests do not pass PCI write transfer requests and vice versa. In one embodiment of the present invention PCI interface 325 handles PCI write and read cycles at the same time (e.g., processing a read cycle while waiting for a write to complete) and still maintain proper data ordering.

Figure 5:
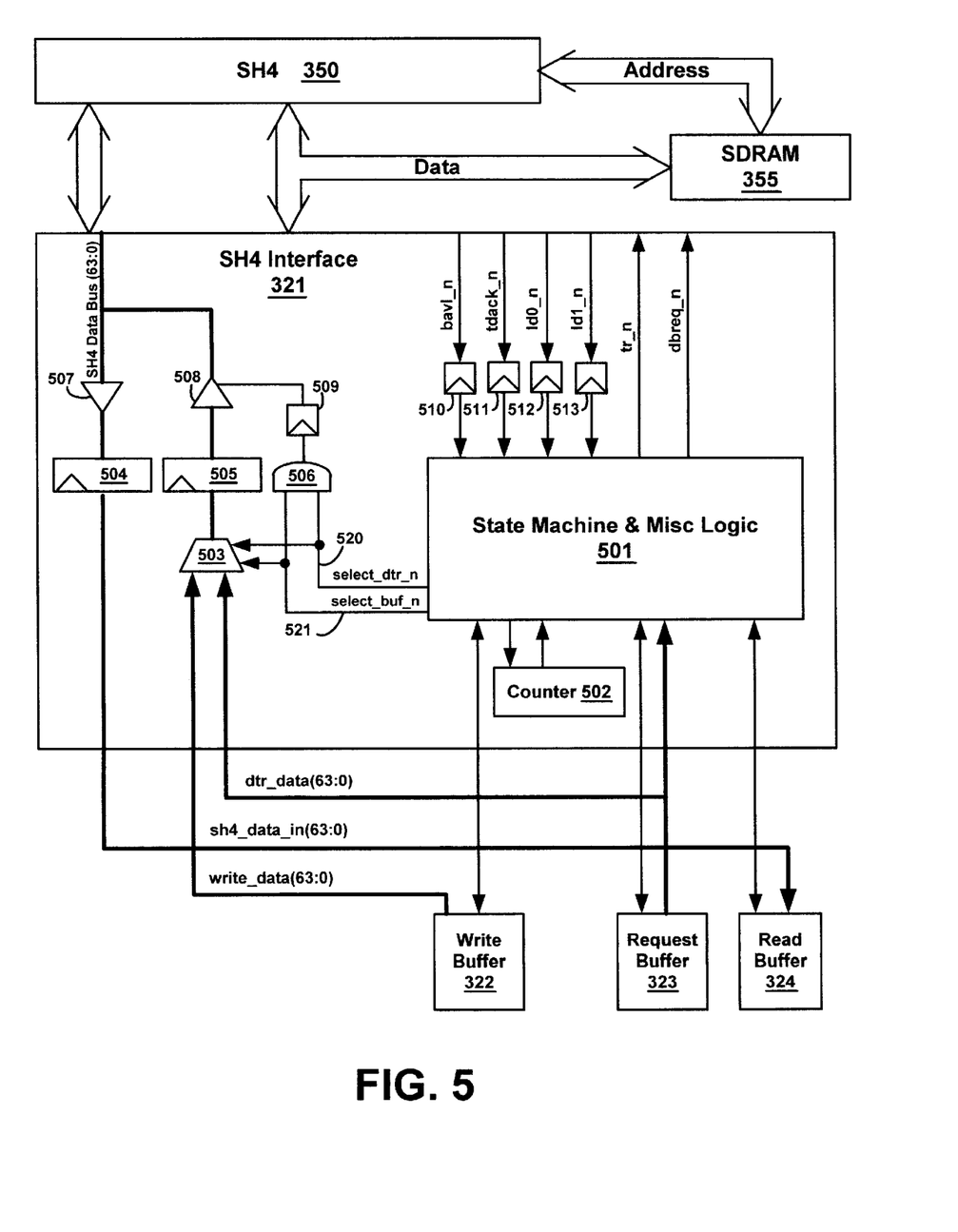
FIG. 5 is a schematic of the SH4 interface included in the PCI to SH4 direct memory access bridge system.

FIG. 5 is a schematic of SH4 interface 321 that is capable of interfacing with 64 bit SDRAMS. In another embodiment SH4 interface 321 interfaces with a 32 bit SDRAM. SH4 interface 321 comprises a state machine 501, DDT counter 502, MUX 503, data out register 505, data in register 504, AND gate 506, data in driver 507, data out driver 508, select register 509, bavl_n register 510, tdack_n register 511, id0_n register 512 and id1_n register 513. SH4 microprocessor's 350 internal bus is coupled to data in driver 507, data out driver 508, bavl_n register 510, tdack_n register 511, id0_n register 512 and id1_n register 513. State machine 501 is coupled to DDT counter 502, MUX 503, AND gate 506, bavl_n register 510, tdack_n register 511, id0_n register 512 and id1_n register 513, write buffer 322, request buffer 323 and read buffer 324. Write buffer 322 and request buffer 323 are coupled to MUX 503 which is coupled to data out register 505 which is coupled to data out driver 508. Read buffer 324 is coupled to data in register 504 which is coupled to data in driver 507. Select register 509 is coupled to AND gate 506 and data out driver 508.

A second state machine (state machine 501) facilitates DDT requests for PCI interface 325. State machine 501 is responsible for determining when a DDT request is required (e.g., when Request Buffer 323 has information in it), for reading request buffer 323 to get transfer request information and generating the actual DDT related signals and for accepting/driving data to the DMA controller in SH4 microprocessor 350 from the data in write buffer 322 and read buffer 324. State machine 501 controls the flow of fundamental message information from request buffer 323 as a data transfer request (DTR) signal (Dtr_data) used to inform SH4 microprocessor 350 of fundamental DDT request information. State machine 501 uses its select_dtr_n output 520 and select_buf_n output 521 to control input MUX 503 and select whether it passes fundamental DDT request information or write buffer data onto SH4 microprocessor's 350 internal bus. State machine 501 utilizes other logic components included in SH4 interface 321 to assist in performing some of these tasks.

DDT counter 502 helps state machine 501 determine various counts it needs to perform a DDT transfer. For example, state machine 501 uses DDT counter 502 to determine if it's taking too long for a bus available (bavl_n) signal to be asserted. If it is taking to long for a bavl_n signal to be asserted then state machine 501 will assert a data bus request (dbreq_n) signal to force SH4 microprocessor 350 to assert a bavl_n signal. State machine 501 then uses DDT counter 502 to count the number of data words transferred during a DDT transaction. After determining the number of data words transferred during a DDT transaction, state machine 501 can determine when the transaction is finished and assert its transfer data acknowledge signal (tdack#) to indicate when data is valid.

SH4 interface 321 (see FIG. 5) includes a number of registers that operate to satisfy timing delay requirements (e.g., timing constraints encountered in systems operating at 100 Mhz motherboard speeds) and resolve difficulties in meeting setup times. Data out register 505 satisfies output timing limitations associated with data flow. Data in register 504 fulfills data input timing limitations associated with data flow. Select register 509 accomplishes configuration timing limitations associated with data flow. The enable signal to the output driver is delayed by one clock cycle since output data is delayed by one clock cycle. Bavl_n register 510, tdack_n register 511, id0_n register 512 and id1_n register 513 fulfill timing requirements associated with control constraints. These registers permit the system to match the timing of input data (which is also registered) and to facilitate meeting setup time requirements. For example Bavl_n register 510 stores data in bus available signals from the DMA controller in SH4 microprocessor 350, tdack_n register 511 stores acknowledgments of valid data transfers, and DDT channel identification registers (e.g., id0_register 512 and id1_n register 513) store identification of the current DDT channel.

For channel 0 DDT transfers, SH4 interface 321 initiates a request by asserting a transfer request (TR#) signal to SH4 microprocessor while at the same time driving the appropriate fundamental DDT request information [a.k.a. data transfer request (DTR)] on the data bus. This fundamental DDT request information includes the DMA channel number (only for channels 0, 1, and 3), source/destination address, direction, transfer count, etc. SH4 microprocessor 350 utilizes this information and modifies its internal DMA controller registers for the appropriate channel (in this case channel 0). SH4 microprocessor 350 asserts its bus available signal (BAVL#) to inform SH4 interface 321 that the SH4 microprocessor 350 internal data bus is available for a DDT request. After SH4 interface 321 has made a DDT request, the data transfer to SDRAM 355 proceeds in a similar manner as other DMA transfers from SH4 microprocessor 350.

SH4 microprocessor 350 informs SH4 interface 321 of its progress through a DMA sequence. SH4 microprocessor 350 asserts its transfer data acknowledge signal (TDACK#) to notify SH4 interface when data is valid (or should be valid in the case of write commands to SDRAM 355). SH4 microprocessor 350 also drives its signals (id0_n and id1_n) through its ID pins to inform SH4 interface 321 which DMA channel the current DMA transfer corresponds to. In addition, SH4 microprocessor 350 permits SH4 interface 321 to immediately request a DDT transfer without waiting for SH4 microprocessor 350 internal data bus to be available, provided that the DDT request corresponds to the same DMA channel as the previous DDT request (e.g., channel 0 in this case).

Figure 6:
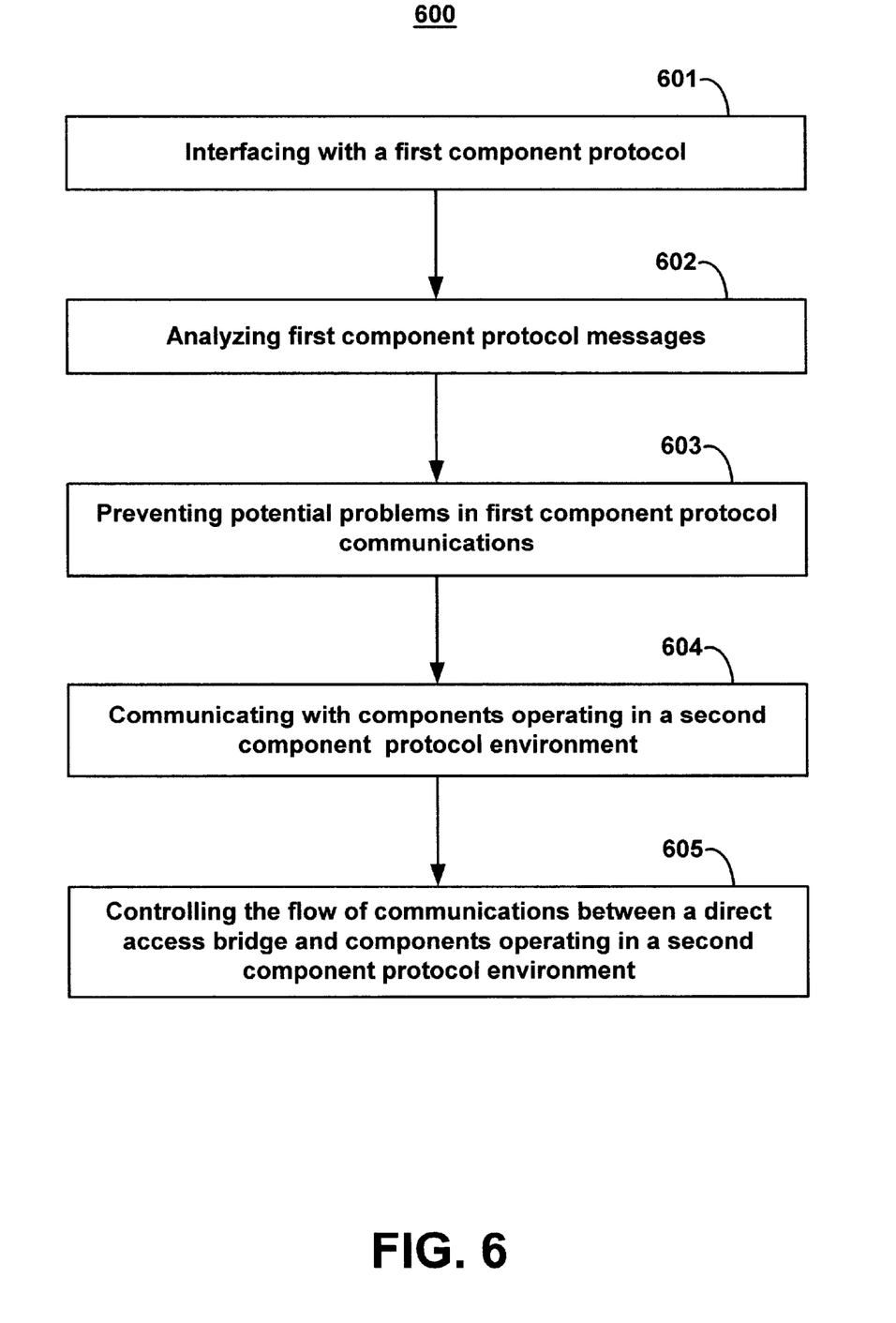
FIG. 6 is a flow chart of the direct memory access bridge method, comprising steps for translating between a first protocol and a second protocol and providing direct access to a memory.

FIG. 6 is a flow chart of direct memory access bridge method 600, comprising steps 601 through 607. Direct memory access bridge method 600 creates a communications bridge between two different protocols allowing a first component to directly access a memory coupled to a second component. In one embodiment of a direct memory access bridge method 600 a PCI master inside a system ASIC chip is able to directly access a main memory associated with a microprocessor coupled to the system ASIC chip. A read or write command in one protocol (e.g., PCI) is analyzed and converted by direct access bridge method 600 into a read or write command of a second protocol (e.g., DDT) and vice versa.

In step 601 a direct access bridge interfaces with a first protocol (e.g., a PCI protocol). Interfacing with a first protocol includes interpreting input messages and generating various output messages, for example read and write commands. In one embodiment of step 601, a direct access bridge interfaces with a PCI protocol by behaving as a PCI target for messages addressed to components operating in a second protocol environment and acting as a PCI initiator for messages issued by components operating in the second protocol environment directed to PCI compatible components.

Interpreting a first protocol environment input signals in step 601 includes monitoring messages to determine if they are directed to components operating in a second protocol environment. For example, if a first component operates in a PCI protocol environment and it transmits a message, the PCI bus is examined during the address phase to determine if the message is addressed to a component operating in the second protocol environment. In one embodiment of direct access bridge method 600, the address of a PCI initiator is stored in a register (e.g., PCI Addr register 409) and in accordance with PCI protocol the target address is latched so it can be subsequently decoded. If a message is being transmitted to a component operating in a second protocol environment (e.g., SH4 microprocessor DDT protocol), an appropriate output message (e.g., asserting trdy_n stop_n, devsel_n) is issued to the first component initiator. Generating output messages in step 601 also involves formulating appropriate PCI messages based upon messages from second protocol components directed to components operating in the PCI environment. In one embodiment of the present invention, information is fetched from a component operating in a second protocol environment. Once enough information is gathered, the data and fundamental message information indicating the master component that initiated the read command is put on a PCI bus.

First protocol messages are analyzed in step 602. Analyzing first protocol messages includes decoding the type of message, preparing data for transfer in a second protocol and assembling fundamental message information comparable to fundamental transfer information required by a second protocol (e.g., the amount of data to be transferred, the corresponding address it is directed to, etc.). In one embodiment of step 602, a direct access bridge analyzes messages transmitted in a PCI protocol and a SH4 microprocessor DDT protocol. To decode the type of PCI message (e.g., whether it is a PCI write or read command) the PCI command/byte enable bus is examined. Data is prepared by storing it in registers in an appropriate format for a transfer. For example, in response to a PCI write command two 32 bit data blocks are latched in a 64 bit register to transform data from a 32 bit protocol of PCI to a 64 bit SH4 microprocessor DDT protocol. In another embodiment a transform is not required because DDT protocol supports less than 64 bus widths. In response to a read command 32 bytes of data are prefetched (64 bits at a time) and presented to a PCI bus (via a MUX) 32 bits at a time. A 64 bit data block is latched in a 64 bit register while a MUX divides a previous 64 bit data block into 32 bit data blocks. Information on the C/BE bus is used to assemble fundamental message information, for example information on which C/BE signals are asserted is fed into miscellaneous logic that calculates the number of bytes to be transferred and how to prefetch the data.

Direct access bridge method 600 prevents potential problems in first protocol communications in step 603. In one embodiment, direct access bridge method 600 prevents problems in PCI protocol communications directed to components operating in a SH4 microprocessor DDT protocol environment. For example, data ordering is preserved (e.g., read transfers cannot pass write transfers and vice versa), standard PCI retry requirements are satisfied, sufficient support for delayed transactions is provided, potential deadlock situations are handled and potential PCI master starvation is minimized.

In one embodiment of direct access bridge method 600, PCI retry requirements are satisfied by adhering to PCI specification "16" tick or "8 tick" rules regarding retries. Support for delayed transactions is provided in one embodiment by securing appropriate storage capacity (e.g., enough to handle prefetches of read data after issuing a retry). Deadlock/livelock situations are prevented in one embodiment by temporarily stopping a master component from continuing to write or read to another component and flushing prefetch registers when needed. In one embodiment potential PCI master starvation is minimized by storing the grant of a PCI master in a queue when it requests access and granting access in accordance with the queue.

In step 604 a direct access bridge communicates with components operating in a second protocol environment. In one embodiment, direct access bridge method 600 converts messages in a first protocol into messages in SH4 microprocessor DDT protocol. For example, PCI read and write commands are converted into DDT requests to transfer data and information to and from components operating in a SH4 microprocessor protocol environment. For example, the DDT request process includes determining if it's taking too long for a bus available (bavl_n) signal to be asserted. If it is taking to long for a bavl_n signal to be asserted then a data bus request (dbreq_n) signal is asserted to force an SH4 microprocessor to assert a bavl_n signal. Then the number of data words transferred during a DDT transaction are counted. After the appropriate number of data words are transferred during a DDT transaction, the transaction is finished and a transfer data acknowledge signal (tdack#) is transmitted to indicate when data is valid.

In one embodiment of step 604, PCI protocol read and write commands are converted into DDT requests. The direction of the message is examined. If the message originated in a PCI component, data and fundamental message information is retrieved after a determination that a DDT transaction is required. Fundamental message information is rearranged into a data transfer request (DTR) signal (e.g., Dtr_data) used to inform a SH4 microprocessor of fundamental DDT request information (transfer size, direction, transfer count, address, channel ID, etc.), and data is converted into a SH4 microprocessor protocol format. If the message originates in a DDT protocol component the fundamental DDT request information is transformed into fundamental message information. In one embodiment, some of the fundamental message information related to PCI read commands is stored and available without having to convert fundamental DDT request information.

The flow of communications between a direct access bridge and components operating in a second protocol environment is controlled in step 605. In one embodiment, the conversion from a first protocol to SH4 microprocessor protocol is controlled. A transfer request signal (e.g., tr_n) is asserted while fundamental DDT request information is transmitted to a DDT protocol component ( e.g., a DMA controller in a SH4 microprocessor). When a SH4 microprocessor has data ready (e.g., PCI component reading system memory) or wants data to be put on the bus (PCI component writing to system memory) it asserts a tdack-n signal.

The present invention direct access bridge system and method translates messages in one protocol into another protocol and permits one component to have direct access to another component's memory. It does not have to rely on each component having its own specific interface to a memory component and it permits a system to be built with fewer individual memory components than prior art systems and methods. The direct access bridge system and method enables smaller pin counts associated with an ASIC system and allows system designs that are more economical than prior art while still providing enough performance for most systems. It also provides an interface capable of translating between a Hitachi SH4 microprocessor with a demand data transfer protocol and internal ASIC PCI bus.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A PCI to SH4 direct access bridge providing translation between PCI bus protocol messages and SH4 microprocessor bus protocol messages comprising:

a PCI interface component compliant with said PCI bus protocol, said PCI interface component adapted to receive and transmit data and fundamental message information to and from a PCI bus, and a SH4 interface compliant with said SH4 microprocessor bus protocol and coupled to said PCI interface, said SH4 interface adapted to receive and transmit said data and fundamental transfer information to and from a SH4 microprocessor demand data transfer (DDT) protocol bus, wherein said SH4 interface component includes:

a first state machine adapted to initiate control commands for components of said SH4 interface component and form DDT requests;

a DDT counter coupled to said second state machine, said DDT counter is adapted to assist said second state machine determine counts required to perform DDT requests and transfers;

a MUX coupled to said second state machine, said MUX is adapted to pass fundamental message information or data associated with a DDT request onto said SH4 microprocessor internal bus; and a plurality of control registers, said plurality of control registers being adapted to satisfy timing requirements and control constraints.

2. The direct access bridge of claim 1 wherein said direct access bridge is adapted to utilize a DDT feature of said SH4 microprocessor DDT protocol and provide direct access from a first PCI component to memory associated with said SH4 microprocessor.

3. The direct access bridge of claim 1 wherein:

said direct access bridge transforms PCI bus protocol write commands into a request for a controller in said SH4 microprocessor to transfer data associated with said PCI bus protocol write commands to said memory; and said direct access bridge transforms PCI bus protocol read commands into a request for said controller in said SH4 microprocessor to transfer data associated with said PCI protocol read commands from a memory operating in SH4 microprocessor DDT protocol environment to a PCI bus.

4. The direct access bridge of claim 1 wherein said PCI interface component comprises:

a second state machine adapted to initiate control commands for components of said PCI interface component;

a second register coupled to said first state machine, said first register being adapted to latch PCI master data associated with a write command;

a second register coupled to said second state machine, said second register being adapted to latch data associated with a read command;

a plurality of fundamental message information registers coupled to said second state machine, said fundamental message information registers being adapted to store fundamental message information; and a MUX coupled to said second state machine, said MUX being adapted to multiplex read data during read commands from said PCI master.

5. The direct access bridge of claim 4 wherein said plurality of fundamental message information registers comprise:

a third register coupled to said second state machine, said third register being adapted to latch a PCI master's address;

a fourth register coupled to said second state machine, said fourth register being adapted to store said PCI master's address during read cycles for pending read operations;

a fifth register coupled to said second state machine; said fifth register is adapted to latch a PCI bus grant signal until a PCI protocol frame signal is asserted; and a sixth register coupled to said second state machine, said sixth register is adapted to latch the state of a PCI bus arbiter grants in a queue.

6. The direct access bridge of claim 4 wherein said PCI interface further comprises:

translation logic coupled to said second state machine, said translation logic being adapted to assist said second state machine extract fundamental message information from PCI protocol messages, including transfer count, address, and data size; and a PCI data counter coupled to said second state machine, said PCI data counter being adapted to count data as it is received during PCI write cycles.

7. The direct access bridge of claim 4 wherein said PCI interface further comprises a read counter coupled to said second state machine, said read counter is adapted to store a current PCI master's address during a pending read command and support large read buffers.

8. The direct access bridge of claim 4 wherein said PCI interface further comprises a read counter coupled to said second state machine, said read counter is incremented during a pending read command in instances when an amount of data to be transferred in a transaction is greater than a buffer can handle.

9. The direct access bridge of claim 1 wherein said plurality of control registers comprises:

a data out register coupled to said first state machine, said data output register is adapted to satisfy output timing limitations associated with data flow;

a data in register coupled to said first state machine, said data in register is adapted to satisfy data input timing limitations associated with data flow;

a select register coupled to said first state machine, said select register is adapted to satisfy configuration timing limitations associated with data flow;

a bavl_n register coupled to said first state machine, said bavl_n register is adapted to store bus available signals from said SH4 microprocessor;

a tdack_n register coupled to said first state machine, said tdack_n register adapted to store acknowledgments of valid data transfers; and a DDT channel identification register coupled to said first state machine, DDT channel identification register adapted to store identification of the current DDT channel.

10. The direct access bridge of claim 1 wherein said SH4 interface further comprises:

a data in driver coupled to said first state machine, said data driver is adapted to drive data signals to read buffer; and a data out driver coupled to said first state machine, said data out driver is adapted to drive data signals to a controller in a SH4 microprocessor.

11. The direct access bridge of claim 1 wherein said first state machine is adapted to determine when a DDT transfer is required, read a buffer to retrieve DDT request information, generate DDT related signals, choose a DDT channel and select whether said MUX drives fundamental message information required for a DDT request or write data onto SH4 microprocessor's internal bus.

12. The direct access bridge of claim 1 wherein said DDT counter is adapted to determine if it's taking longer than a predetermined time for a bus available signal (bavl_n) to be asserted and to count the number of data words transferred during a DDT request.

13. A direct access bridge method comprising the steps of:
a) interfacing with a first protocol;
b) analyzing first component protocol messages;
c) preventing potential problems in first protocol communications;
d) communicating with components operating in a second protocol environment; and
e) controlling the flow of communications between a first protocol and a second protocol, wherein said controlling includes:
determining if it's taking too long for a bus available (bavl_n) signal to be asserted;
asserting a data bus request (dbreq_n) signal to force an SH4 microprocessor to assert a bavl_n signal;
counting the number of data words transferred during a demand data transfer (DDT); and
transmitting a transfer data acknowledge signal (tdack#) to indicate data is valid.

14. The direct access bridge of claim 13 wherein step a further comprises interpreting input messages including monitoring messages to determine if they are directed to components operating in a second protocol environment; and generating various output messages.

15. The direct access bridge of claim 13 wherein step a2 further comprises:

formulating appropriate PCI messages based upon messages from components operating in a SH4 microprocessor demand data transfer (DDT) protocol environment directed to components operating in the PCI environment.

16. The direct access bridge of claim 13 wherein step b further comprises:

decoding the type of message;

preparing data for transfer in a second component protocol; and assembling fundamental message information comparable to fundamental transfer information required by a second component protocol.

17. The direct access bridge of claim 13 wherein step c further comprises:

preserving data ordering in a manner that prevents read commands from passing write commands and vice versa;

satisfying standard PCI retry requirements;

providing sufficient support for delayed transactions;

handling potential deadlock situations; and minimizing potential PCI master starvation.

18. The direct access bridge of claim 13 wherein step d further comprises:

converting messages in a first protocol into message in SH4 microprocessor DDT protocol.

19. The direct access bridge of claim 13 wherein step d further comprises:

converting PCI protocol read and write commands into DDT requests;

examining the direction of the message;

retrieving fundamental message information after a determination that a DDT transaction is required;

rearranging fundamental message information into a data transfer request (DTR) signal (e.g., Dtr_data) used to inform a SH4 microprocessor of fundamental DDT request information (transfer size, direction, transfer count, address, channel ID, etc.), converting data into a SH4 microprocessor protocol format;

transforming fundamental DDT request information into fundamental message information.

20. The direct access bridge of claim 13 wherein step e further comprises:

transmitting data and fundamental DDT request information; and asserting a transfer request signal while fundamental DDT request information is transmitted to a DDT protocol component.

* * * * *